United States Patent Office.

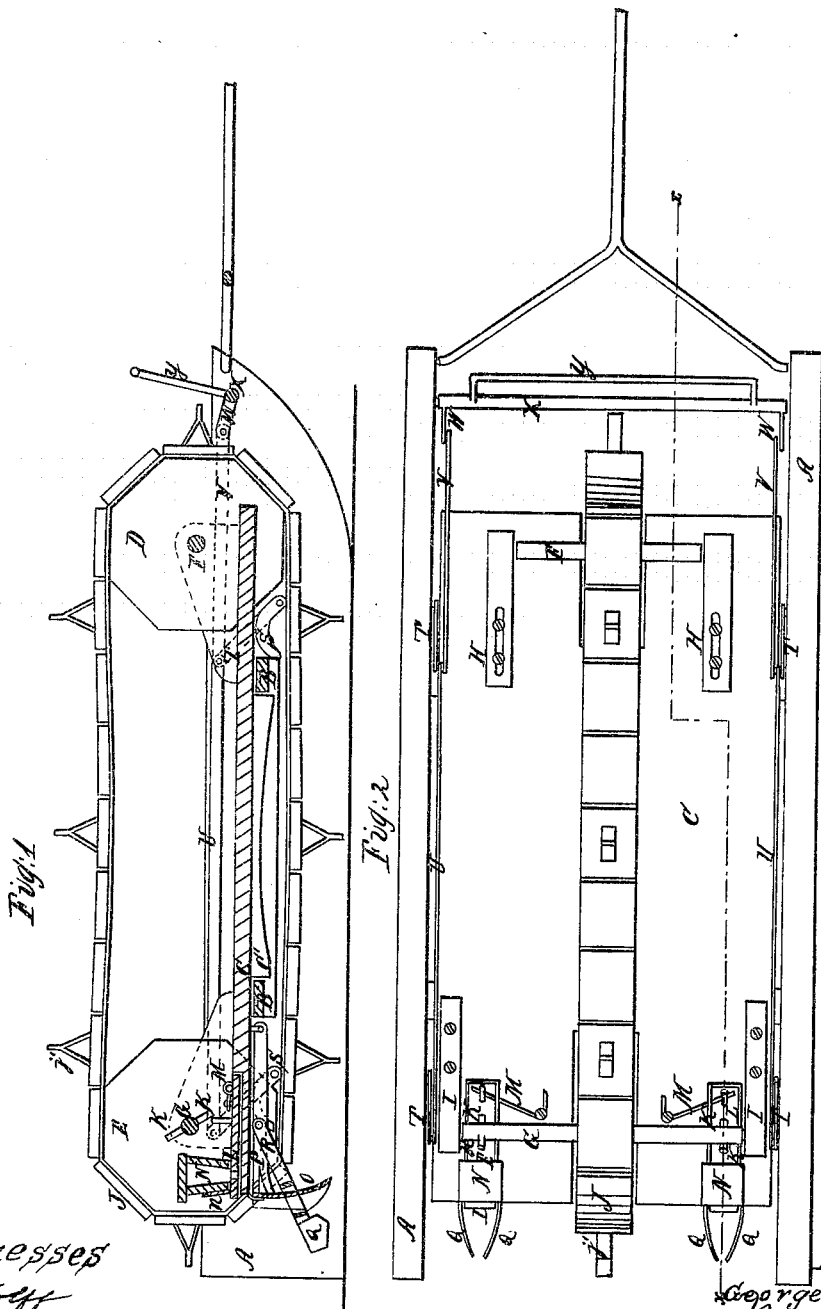

GEORGE H. WOOD, OF CAMBRIDGE CITY, INDIANA.

Letters Patent No. 91,399, dated June 15, 1869.

---

IMPROVEMENT IN CORN-PLANTERS.

---

The Schedule referred to in these Letters Patent and making part of the same.

---

*To all whom it may concern:*

Be it known that I, GEORGE H. WOOD, of Cambridge City, in the county of Wayne, and State of Indiana, have invented a new and improved Corn-Planter; and I do hereby declare that the following is a full, clear, and exact description thereof, which will enable others skilled in the art to make and use the same, reference being had to the accompanying drawing, forming part of this specification, in which—

Figure 1 is a vertical longitudinal detail sectional view of my improved corn-planter, taken through the line *x x*, fig. 2.

Figure 2 is a top view of the same.

Similar letters of reference indicate corresponding parts.

My invention has for its object to furnish a simple, convenient, and accurate corn-planter, which shall be so constructed and arranged as to plant the corn at uniform distances apart, without the gaining or losing of space, which is unavoidable when the planter is operated by wheels rolling upon the ground; and It consists in the construction and combination of the various parts of the machine, as hereinafter more fully described.

A are the runners, and B are the beams of an ordinary farm-sled, about the construction of which there is nothing new.

C is a platform, or frame, laid upon the beams B of the sled, and kept in place by blocks, *c'*, attached to the under side of said platform C, and resting against the beams B, as shown in fig. 1.

D and E are two polygonal wheels, placed at any suitable distance apart, and rigidly attached to the axles F and G, respectively, so as to carry the said axles with them in their revolution.

The wheels D and E are made larger or smaller, and with more or less faces, according to the required distance apart of the hills.

The axle F revolves in bearings H, adjustably attached to the platform C, so that the position of the wheel D may be adjusted to tighten or slacken the belt, as may be desired.

The rear axle G revolves in bearings I, rigidly attached to the said platform C.

J is an endless belt, or chain, which passes around the wheels D and E, and the plates or links of which are made of such a size as to fit upon the faces of the wheels D and E.

The belt or chain J may be formed by attaching the plates or links to a flexible band, or by connecting said plates or links by short bars or links, the ends of which are pivoted to the side-edges of said plates, or to bars attached to said side-edges.

The plates of the belt or chain J, or a sufficient number of said plates, are provided with projecting spikes, or teeth, *j*, which, as the machine is drawn forward, take hold of the ground and detain the said belt J, causing the wheels D and E to revolve.

Through the axle G, upon both sides of the wheel E, and at the distances apart required for the hills, are passed pins, K, the ends of each of which project upon both sides of the said axle G, so as, as the axle G revolves, to strike against catches upon the dropping-slides L, and move them to drop the seed.

As soon as the slides L are released from the pins K, they are drawn back to their places by the springs M, one end of each of which is connected with the said slides L, and the other ends of which are connected with the platform, or frame C.

N are the seed-hoppers, which are attached to the rear part of the platform C, at a distance apart equal to the required distance apart of the hills.

Through the lower part of the hoppers N pass the slides L, which receive the corn, remove it from the hoppers, and drop it into the furrows in the rear of the furrowing or marking-plows O.

To the rear part of the hoppers N, above the opening through which the slides L move, are attached rubber or leather plates, *n'*, to prevent more corn than enough to fill the holes in the slides L from passing out with said slides, and also to prevent the corn from clogging the said openings.

O are the furrowing-plows, the beams P of which are attached to the under side of the platform C, in such positions that the said plows may open furrows to receive the seed as the machine is drawn forward.

Q are the covering-plows, two of which are used with each furrowing-plow O, to cover the seed as it is dropped into the furrows opened by the plows O.

The beams R of the covering-plows Q rest upon shoulders formed upon the sides of the standards of the plows O, and their forward ends are pivoted to the beams P, as shown in fig. 1.

S are curved arms, pivoted to the inner sides of the runner A, near their forward and rear ends, and beneath the platform C.

To the curved arms S are rigidly attached the lower ends of the arms, or levers, T.

U are bars, or rods, the rear ends of which are pivoted to the rear arms, or levers, T, and the forwards ends of which are pivoted to the forward arms, or levers, T.

V are bars, or rods, the rear ends of which are pivoted to the forward arms, or levers, T, and the forward ends of which are pivoted to the ends of the arms W, rigidly connected with the shaft X, which works in bearings in the runners A, and which is provided with a lever, or handle, Y, so that it may be conveniently operated by the driver.

By this arrangement, by operating the shaft X, the platform, and all the parts connected with it, may be raised from the ground, stopping the operation of the planting-mechanism.

Having thus described my invention, I claim as new, and desire to secure by Letters Patent—

1. The endless toothed belt, or chain, arranged as described, for operating the dropping-device of a corn-planter, substantially as herein set forth.

2. The combination of the toothed belt or chain J, polygonal wheels D E, axles F G, pins, or projections K, and springs M, with the platform, or frame, C, and dropping-slides L, of the seed-hoppers N, substantially as herein shown and described, and for the purpose set forth.

3. The combination and arrangement of the pivoted curved arms S, arms, or levers, T, pivoted connecting-bars U and V, arms W, and shaft X, provided with a lever, or handle, Y, with each other and with the runners A, and platform, or frame, C, substantially as herein shown and described, and for the purpose set forth.

GEORGE H. WOOD.

Witnesses:
GEORGE DALLAS JACKSON,
J. B. SHARP, (or JOSEPH B.)